United States Patent [19]
Yamashita et al.

[11] Patent Number: 5,918,000
[45] Date of Patent: *Jun. 29, 1999

[54] DATA TRANSFER CONTROL DEVICE AND METHOD FOR SWITCHING MEMORY REGIONS BETWEEN STORAGE DEVICES WHEN ACCESSING IS HALTED

[75] Inventors: Hiroaki Yamashita, Fukuoka; Yasushi Inamoto; Kiichi Matsuda, both of Kawasaki, all of Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/539,774

[22] Filed: Oct. 5, 1995

[30] Foreign Application Priority Data

Jan. 30, 1995 [JP] Japan .................................... 7-013095

[51] Int. Cl.[6] .................................................. G06F 11/08
[52] U.S. Cl. ...................................... 395/182.05; 711/114
[58] Field of Search ............................... 395/441, 182.05, 395/182.04, 439, 182.06; 711/111, 112, 114, 5

[56] References Cited

U.S. PATENT DOCUMENTS

| | | | |
|---|---|---|---|
| 5,077,736 | 12/1991 | Dunphy, Jr. et al. | 395/182.05 |
| 5,331,646 | 7/1994 | Krueger et al. | 395/182.05 |
| 5,459,853 | 10/1995 | Best et al. | 395/441 |
| 5,517,632 | 5/1996 | Matsumoto et al. | 395/441 |
| 5,523,899 | 6/1996 | Parken et al. | 360/77.04 |
| 5,542,064 | 7/1996 | Tanaka et al. | 395/441 |
| 5,564,116 | 10/1996 | Arai et al | 395/182.05 |
| 5,590,381 | 12/1996 | Mourad | 395/441 |

*Primary Examiner*—Eddie P. Chan
*Assistant Examiner*—Gary J. Portka
*Attorney, Agent, or Firm*—Helgott & Karas, P C.

[57] ABSTRACT

A data transfer control device and controlling method in which data on a storage medium is read continuously. The data transfer control device includes M storage units each for storing respectively at least two kinds of different data among N kinds of data in memory regions, a transmission control element for transmitting the N kinds of data and a spare storage unit for storing at least one kind of data among said N kinds of data. The transfer control device includes a judging element for judging whether accessing any one of the M storage units must be halted. Switching element for switching a memory region to the spare storage unit and the remaining (M−1) storage unit when the judging element judges that accessing must be halted and then the switching element performs an accessing operation. The data transfer control device can suppress an increase in the device forming cost, power consumption, and installation area, and can increase the amount of data which can be stored according to the number of storage units installed.

18 Claims, 14 Drawing Sheets

DATA TRANSFER CONTROL DEVICE AND METHOD FOR SWITCHING MEMORY REGIONS BETWEEN STORAGE DEVICES WHEN ACCESSING IS HALTED

BACKGROUND OF THE INVENTION

1) Field of the Invention

The present invention relates to a data transfer control device and a data transfer controlling method each of which reads continuously data out of storage media such hard disks and magneto-optic disks.

2) Description of the Related Art

Recently, with the advance and standardization of the digital dynamic image signal compression and expansion technique typified by ISO (International Organization for Standardization) /MPEG (Motion Picture Image Coding Expert Group) and a rapid progress in the digital communications technology such as conversion into the network broadband (B-ISDN, etc.) by the ATM communications system, various multimedia services originating the video-on demand (VOD) services are being realized.

The VOD service means that a host provides multimedia data including information regarding motion picture data and voice data with respect to a time axis, or information regarding movies, sports, shopping, and the like to each of clients, based on requests from respective subscribers.

FIG. 11 is a block diagram showing a system of offering a VOD service. Referring to FIG. 11, numeral 100 represents a server (data transfer control unit). The server 100 provides data in response to a request from a client 104. The server 100 includes a storage unit 101, a data transfer unit 102, and a control unit 103.

The storage unit 101 stores multimedia data (hereinafter, referred sometimes to merely as data) including information regarding movies, sports, shopping, and the like. The storage unit 101 with a large memory capacity can transfer data at ultrahigh speed.

The data transfer unit 102 uses a network 105 such as an ATM network and transfers data stored in the storage unit 101 to a client 104. The control unit 103 implements an address management, a data title retrieval, or subscriber information management, based on the data request from the client 104.

The client 104 requests data to the control unit 103 in the server 100 via the network 105.

Even if several ten thousand clients 104, for example, concurrently request data, desired data is transferred to the clients 104. In the server 100, a readable, writable, random-accessible hard disk which is low in a bit unit cost is used as the storage unit 101. However, in order to reduce the cost of the system, it is needed to transfer effectively data from a hard disk at a speed close to the data transfer rate of the input/output bus (such as SCSI (Small Computer System Interface) bus) of a hard disk.

However, when the SCSI bus with a transfer capability of about 20 MBps is used to transfer data from the hard disk, data cannot be transferred to the SCSI bus during the total period of the SCSI command acceptance time, seek time, rotation queue time, and HD to buffer transfer time. Hence the effective transfer rate becomes relatively low, compared with the transfer capability of the SCSI bus.

In this case, it is considered that the storage unit 101 connected to the same SCSI bus 106, as shown in FIG. 12, is formed of plural (e.g. three) hard disks (HD1 to HD3) 101-1 to 101-3. Pieces obtained by dividing a program such as a film in a unit are split-recorded into the plural hard disks. Thus while a hard disk is transferring data on the SCSI bus, another hard disk prepares to transfer data so that the transfer capability of the SCSI bus can be improved.

In particular, at the times t1, t2, and t3 shown in FIG. 13 (timechart used for explaining the operation of the data transfer control device including the storage unit 101 shown in FIG. 12), the control unit 103 controls so as to prepare the data transfer of the hard disks 101-2 and 101-3 during transferring data from the hard disk 101-1 to the SCSI bus 106.

In the timechart, the sign "CMD" represents a readout command issuing time. "access" represents a data access time. The sign "HD→FIFO" represents a data transfer time during which data is transferred from a hard disk to the buffer in the hard disk, or a media read time.

There is a problem in that because data cannot be read out of the corresponding hard disk when either a head position correction (calibration) to a change in temperature which must be performed at several minute intervals during the use of a hard disk or the mechanical failure of a hard disk occurs, data cannot be transferred so that data transfer to the client 104 is interrupted.

Hence, in order to realize the video server with a hard disk, it is required to guarantee a continuous data transfer even if a calibration or a mechanical failure of a hard disk should occur.

In order to deal with such a problem, it is considered that the continuous data transfer is warranted in a calibration or a mechanical failure of a hard disk by using as the storage unit 101 hard disks (HD1 to HD3) 101-1 to 101-3 and spare hard disks (HD4 to HD6) 101-4 to 101-6, each storing information similar to that of each of the hard disks, which are interconnected via the SCSI bus 106 acting as an input/output bus, as shown in FIG. 14.

In other words, the hard disks 101-1 and 101-4 store the transfer data "A"; the hard disks 101-2 and 101-5 store the transfer data "B"; and the hard disks 101-3 and 101-6 store the transfer data "C".

In such a configuration, the data transfer control unit including the storage unit 101 shown in FIG. 14 operates as shown with the timechart in FIG. 15.

In the timechart, the sign "CMD" represents a read command issuing time. "access" represents a data access time. The sign "HD→FIFO" represents a data transfer time during which data is transferred from a hard disk to the buffer of the hard disk, or a media read time.

As shown with the time t4 to time t5 in the timechart, in a normal use time at which there is no calibration or no mechanical failure of a hard disk, the hard disks 101-1 to 101-3 perform data transfer according to the reading order of hard disks 101-3→101-1→101-2 (→101-3)→. . . (transfer data: "C"→"A"→"B"(→"C")→. . . ).

In a calibration of the hard disk 101-2, the hard disk is calibrated by issuing a calibration command "CMD" to the hard disk 101-2 at, for example, the time t6 while it is controlled that the spare hard disk 101-5 is used as a transfer source of transfer data (refer to time (t7)).

That is, the continuous data transfer is guaranteed by switching the reading sequence in such a manner that data are read out of the hard disks 101-1, 101-2, 101-3, . . . , sequentially, and then data are read out of the hard disks 101-1, 101-5, 101-3, . . . , sequentially.

Even if the hard disk 101-2 is mechanically failed in use, the continuous data transfer is guaranteed like the case in the above-mentioned calibration.

However, in the data transfer control device having the storage unit shown in FIGS. 12 or 14, the hard disks used as the storage unit 101 are increased twice in number those used in normal use. Hence there are disadvantages in that the device forming cost, power consumption, and installation space are increased. Further problem is that the capacity data storable in a hard disk becomes small.

Furthermore, the number of hard disks connectable to the SCSI bus acting as an input/output bus is limited. In concrete, 8 hard disks can be connected at maximum to the 8-bit SCSI bus and 16 hard disks can be connected at maximum to the 16-bit SCSI bus.

SUMMARY OF THE INVENTION

The present invention is made to overcome the above mentioned problems. An object of the present invention is to provide a data transfer control device that can suppress the increase of the device forming cost, power consumption, and installation area, and also can increase the amount of storable data according to the number of storage units such as hard disks installed.

Another object of the present invention is to provide a data transfer controlling method that can suppress the increase of the device forming cost, power consumption, and installation area, and also can increase the amount of storable data according to the number of storage units such as hard disks installed.

In order to achieve the above objects, according to the present invention, the data transfer control device is characterized by M storage means each for storing respectively at least two kinds of different data among N-kinds of data into memory regions, where M is an integer of 2 or more and N is an integer of 2 or more; transfer control means for accessing the M storage means and then transferring the N-kinds of data; and spare storage means for storing at least one kind of data among the N-kinds of data; the transfer control means including judging means for judging whether accessing any one of the M storage means is halted; and switching means for switching a memory region to the spare storage means and the remaining (M−1) storage means when the judging means judges that accessing any one of the M storage means must be halted, and then performs an accessing operation.

According to the present invention, the data transfer control device includes M storage means, spare storage means, and transfer control means. Therefore, it is guaranteed that data can be continuously transferred to clients, with the amount of storable data increased within the restricted number of hard disks installed, even if accessing the storage means is halted. There is an advantage in that an increase in the device forming cost, power consumption, or installation area can be suppressed.

Furthermore, according to the present invention, the data transfer control device is characterized by M storage means each for storing respectively at least two kinds of different data of N-kinds of data into memory regions, where M is an integer of 2 or more and N is an integer of 2 or more; transfer control means for accessing the M storage means and then transmitting the N-kinds of data; and spare storage means for storing at least one kind of data among the N-kinds of data; the transfer control means including forced switching means for forcibly halting accessing any one of the M storage means at desired constant intervals and for switching a memory region to the spare storage means and the remaining (M−1) storage means.

According to the data transfer control device of the present invention, the forced switching means halts sequentially accessing any one of plural pieces of storage means at arbitrary constant intervals. Then the maintaining means performs a maintenance operation and the position correcting means corrects the position of the read head. Hence there is an advantage in that the reliability of data read out of the storage means can be improved.

According to the present invention, the data transfer controlling method is characterized by the steps of storing respectively at least two kinds of different data of N kinds of data into memory regions of M storage means, where M is an integer of 2 or more and N is an integer of 2 or more; storing at least one kind of data among the N-kinds of data into spare storage means; accessing the M storage means; reading out data stored in the M storage means to a buffer; judging whether accessing any one of the M storage means is halted, to transmit the N-kinds of data; and switching a memory region to the spare storage means and the remaining (M−1) storage means when it is judged that accessing any one of the M storage means must be halted, and then performing an accessing operation.

According to the present invention, the data transfer control method includes M storage means, spare storage means, and transfer control means. Therefore, it is guaranteed that data can be continuously transferred to clients, with the amount of storable data increased within the restricted number of hard disks installed, even if accessing the storage means is halted. There is an advantage in that an increase in the device forming cost, power consumption, or installation area can be suppressed.

Moreover, according to the present invention, the data transfer controlling method is characterized by the steps of storing respectively at least two kinds of different data among N kinds of data into memory regions of M storage means, where M is an integer of 2 or more and N is an integer of 2 or more; storing at least one kind of data among the N kinds of data into spare storage means; accessing the M storage means; reading out data stored in the M storage means to a buffer; halting forcibly accessing any one of the M storage means at arbitrary constant intervals, to transmit the N kinds of data; and switching a memory region to the spare storage means and the remaining (M−1) storage means in an accessing operation.

According to the data transfer control device of the present invention, the forced switching means halts sequentially accessing any one of plural pieces of storage means at arbitrary constant intervals. Then the maintaining means performs a maintenance operation and the position correcting means corrects the position of the read head. Hence there is an advantage in that the reliability of data read out of the storage means can be improved.

DESCRIPTION OF THE PREFERRED EMBODIMENTS (a) Aspects of the Invention

First, let us explain the aspects of the present invention with reference to the attached drawings.

Figure 1:
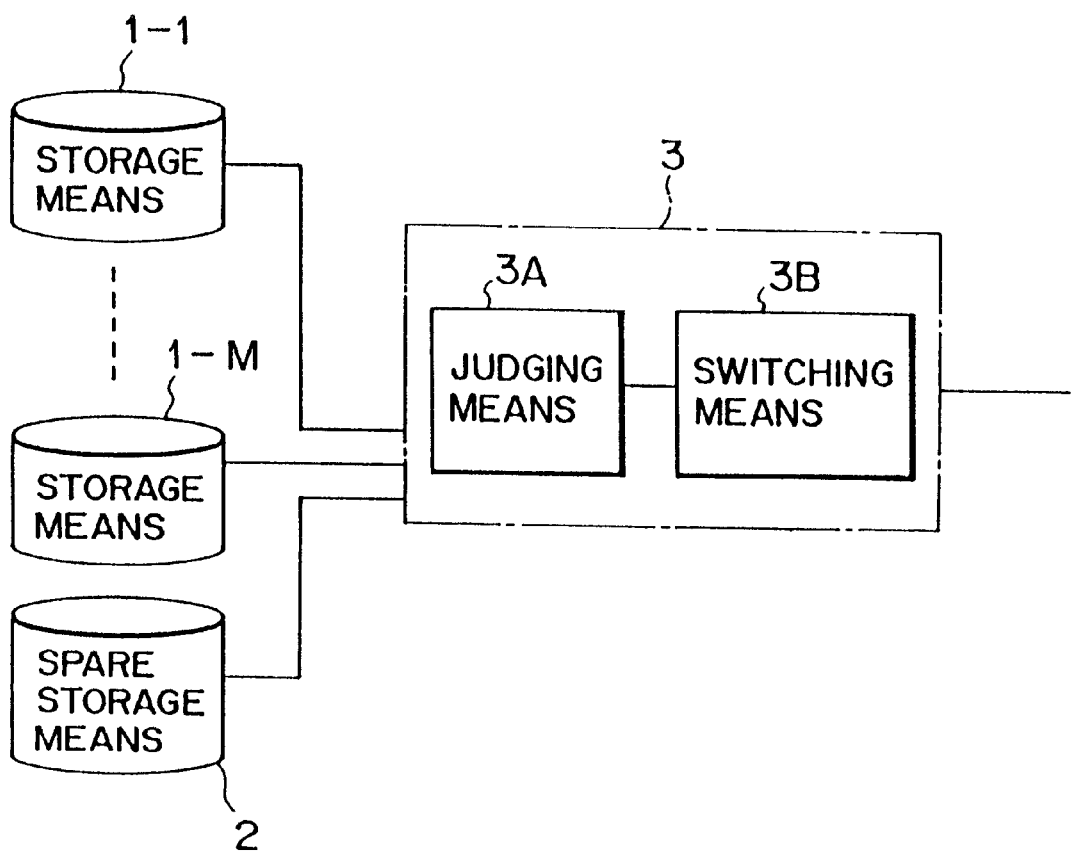
FIG. 1 is a block diagram showing a first aspect of the present invention.

FIG. 1 is a block diagram showing an aspect of the present invention. Referring to FIG. 1, numerals 1-1 to 1-M represent storage means. Each of the storage means 1-1 to 1-M stores at least two kinds of different data of N kinds of data into its storage area.

Numeral 2 represents spare storage means. The spare storage means 2 stores at least one kind of data among N kinds of data.

M and N are integers and can be set equally to each other.

Number 3 represents transfer control means. The transfer control means 3 accesses M storage means to transfer N kinds of data. The transfer control means 3 includes judging means 3A and switching means 3B.

The judging means 3A judges whether accessing any one of M storage means 1-1 to 1-M is to be halted. The switching means 3B switches and accesses the storage unit in the remaining (M−1) storage means and the spare storage means 2 when it is judged that accessing any one of M storage means 1-1 to 1-M must be halted.

The judging means 3A can judge that accessing the failed storage means must be halted when any one of M storage means 1-1 to 1-M is failed and that accessing the storage means to be corrected in position must be halted when the read head of any one of M storage means is corrected in position.

According to the first aspect of the present invention, in order to transfer N kinds of data, M storage means 1-1 to 1-M are accessed to read data stored therein to the buffer (not shown in FIG. 1). Then the judging means 3A judges whether accessing any one of the M storage means 1-1 to 1-M is to be halted. When it is judged that accessing any one of the M storage means must be halted, the switching means 3B selects and accesses the storage region of the remaining (M−1) storage means and the spare storage means 2.

According to the present invention, since the data transfer control device includes M storage means 1-1 to 1-M, the spare storage means 2, and the transfer control means 3, even if accessing the storage means 1-1 to 1-M is halted, the continuous data transfer to clients is guaranteed, with the amount of storable data increased within the limited number of installed hard disks. Hence there is advantage in that an increase in device forming cost, power consumption, or installation area can be suppressed.

Figure 2:
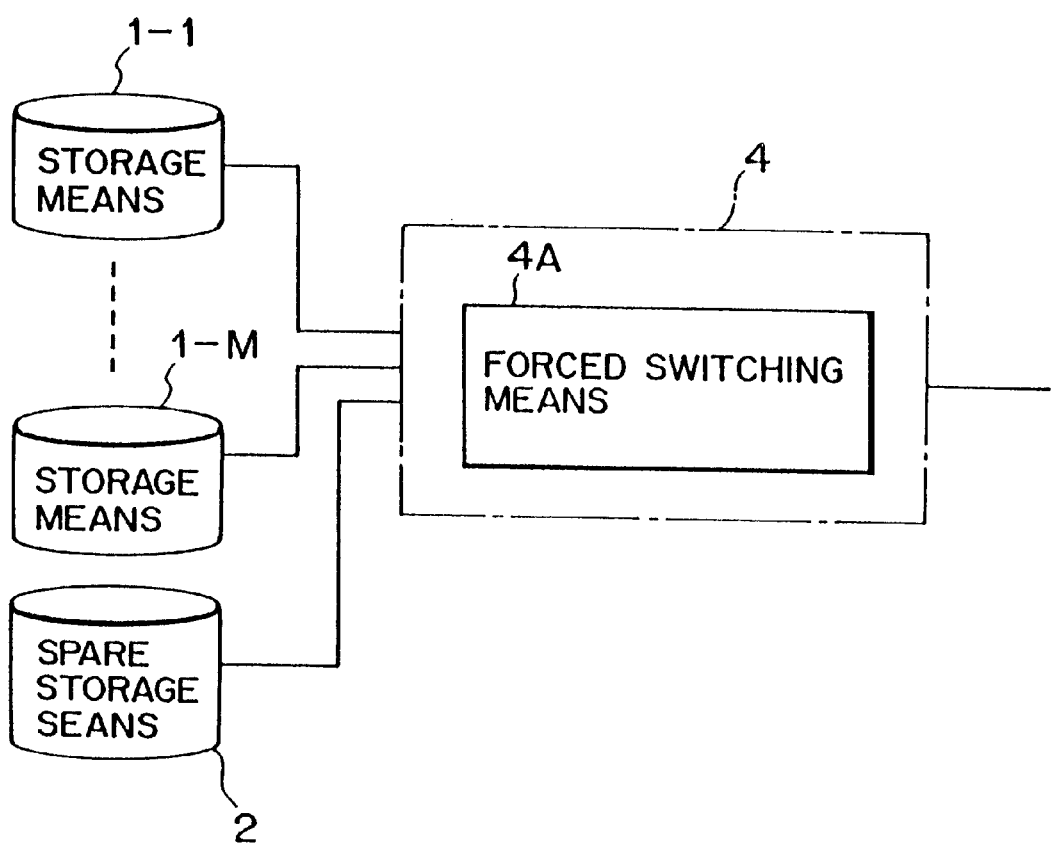
FIG. 2 is a block diagram showing a second aspect of the present invention.

FIG. 2 is a block diagram showing the second aspect of the present invention. Referring to FIG. 2, numerals 1-1 to 1-M represent M storage means. Each of the storage means 1-1 to 1-M stores at least two kinds of different data among N kinds of data.

M and N are integers and can be set equally to each other.

Numeral 2 represents spare storage means. The spare storage means 2 stores at least one kind of data among N kinds of data.

Moreover, numeral 4 represents transfer control means. The transfer control means 4 accesses M storage means 1-1 to 1-M to transfer N kinds of data. The transfer control means 4 includes forced switching means 4A.

The forced switching means 4A halts forcibly accessing any one of M storage means every arbitrary constant intervals and then switches the memory region to the remaining (M−1) storage means and the spare storage means 2 to access the memory region.

The data transfer control device according to the present invention includes maintaining means that maintains the storage means of which the access operation is forcibly halted, and position correcting means that corrects the position of the read head of the storage means which is halted forcibly by the forced storage means 4A.

According to the second aspect of the present invention, when M data stored in M storage means are read to a buffer to transfer M kinds of data by accessing M storage means, the forced switching means 4A halts forcibly accessing any one of the M storage means at every arbitrary constant periods and then selects the memory region to the remaining (M−1) storage means and the spare storage means to access them.

According to the first and second aspects of the present invention, the number M of storage means 1-1 to 1-M can be set to the minimum value expressed by $T \leq M \cdot E/D$, where T is time per cycle to read data by M storage means 1-1 to 1-M, D is an effective data buffer reading rate, and E is a buffer size. Data reading is continuously performed from each of the M storage means 1-1 to 1-M, with a predetermined time delay.

Hence, according to the present invention, since the data transfer control device includes M storage means 1-1 to 1-M, the spare storage means 2, and the transfer control means 4, even if accessing the storage means 1-1 to 1-M is halted, the continuous data transfer to clients is guaranteed, with the amount of storable data increased within the limited number of installed hard disks. Hence there is advantage in that an increase in device forming cost, power consumption, or installation area can be suppressed.

Furthermore, according to the present invention, when the forced switching means 4A halts sequentially accessing the storage means 1-1 to 1-M at arbitrary constant intervals, the maintaining means performs a maintaining operation and the position correcting means corrects the position of the read header. Hence there is an advantage in that the reliability of data read from the storage means 1-1 to 1-M improves.

According to the present invention, the number M of said storage means 1-1 to 1-M is set to the minimum value M satisfying the formula $T \leq M \cdot E/D$, where T is time per cycle in the data reading operation of M storage means, D is an effective data buffer reading rate, and E is a buffer size.

(b) First Embodiment

Figure 3:
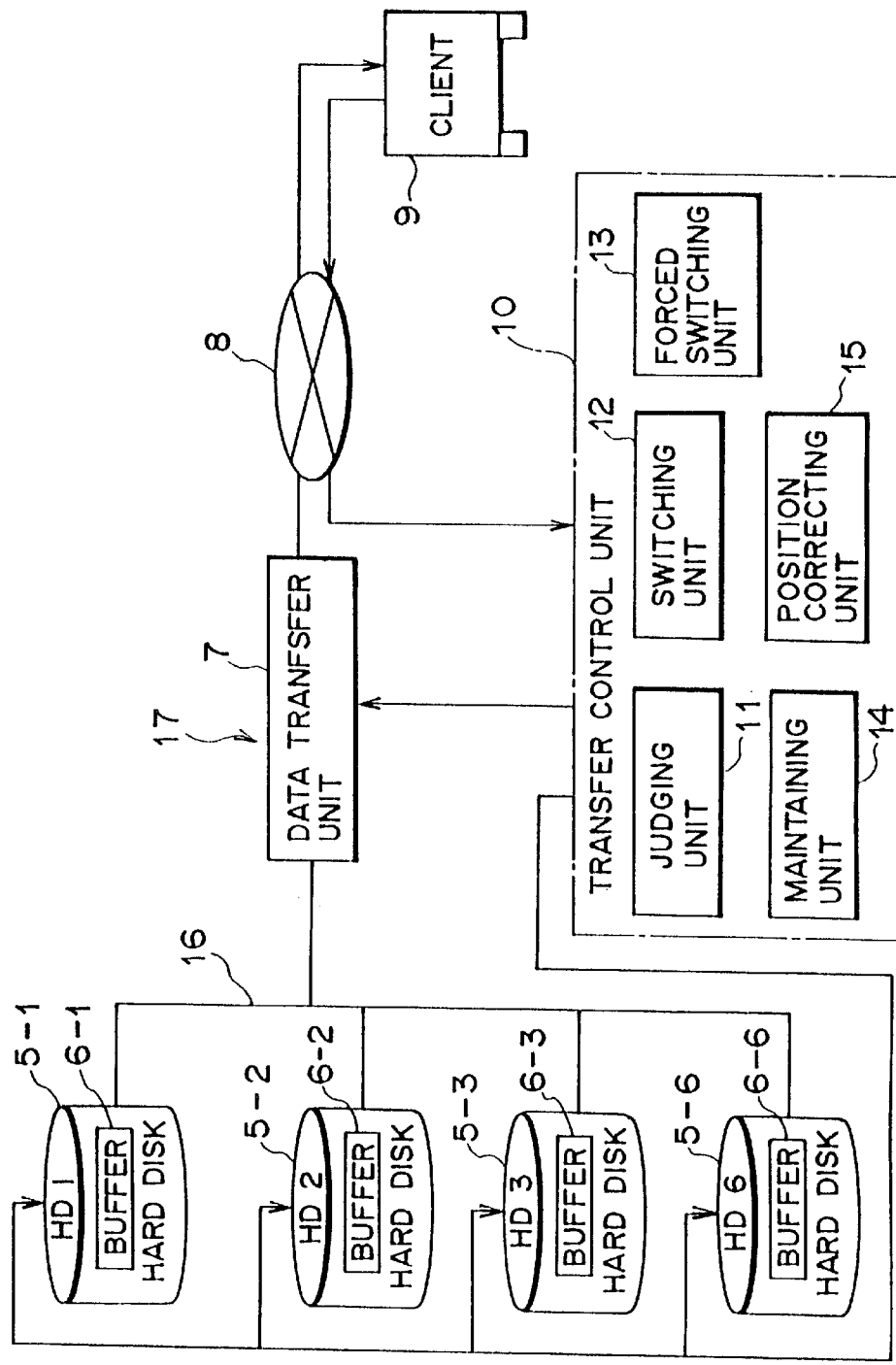
FIG. 3 is a block diagram showing a data transfer control device according to the first embodiment of the present invention.
Figure 11:
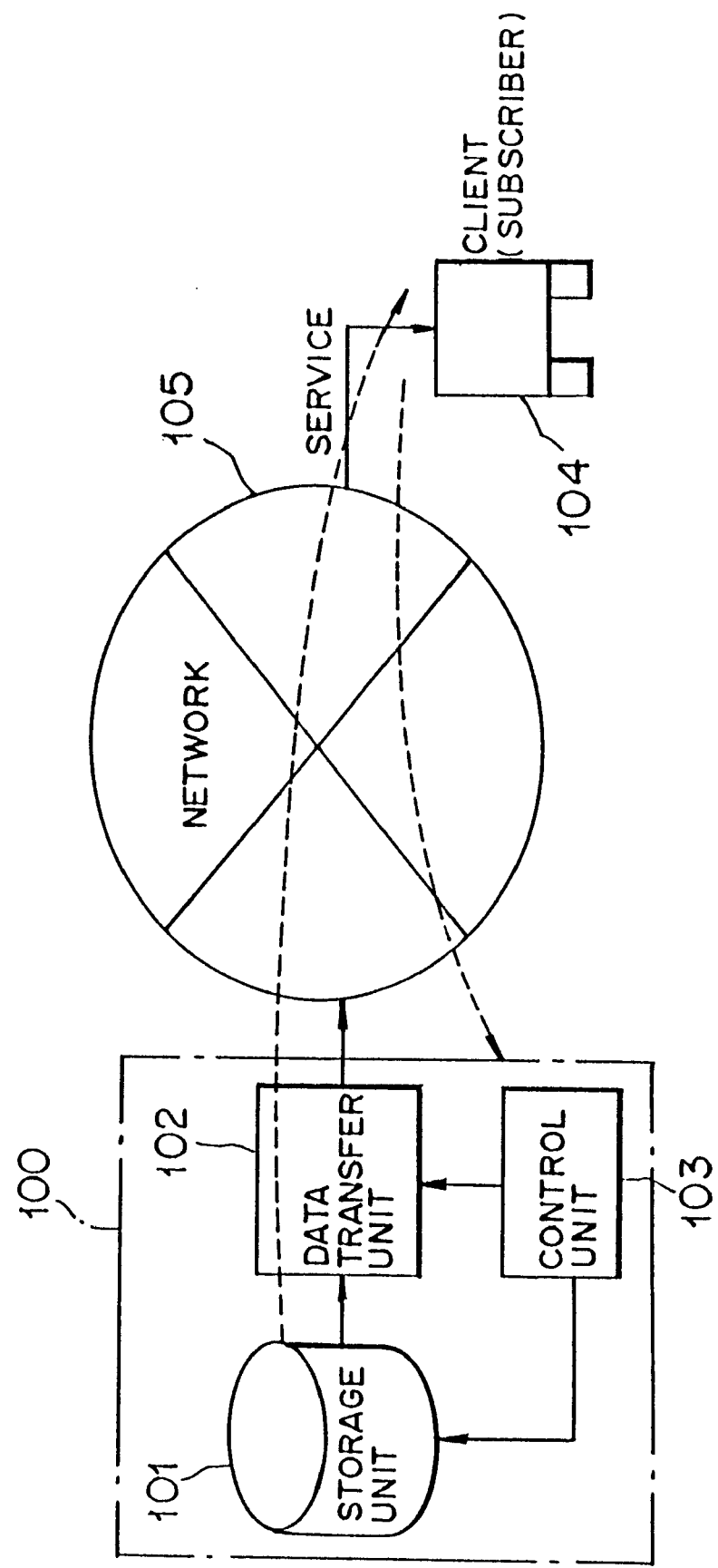
FIG. 11 is a block diagram showing the system for a VOD service.
Figure 12:
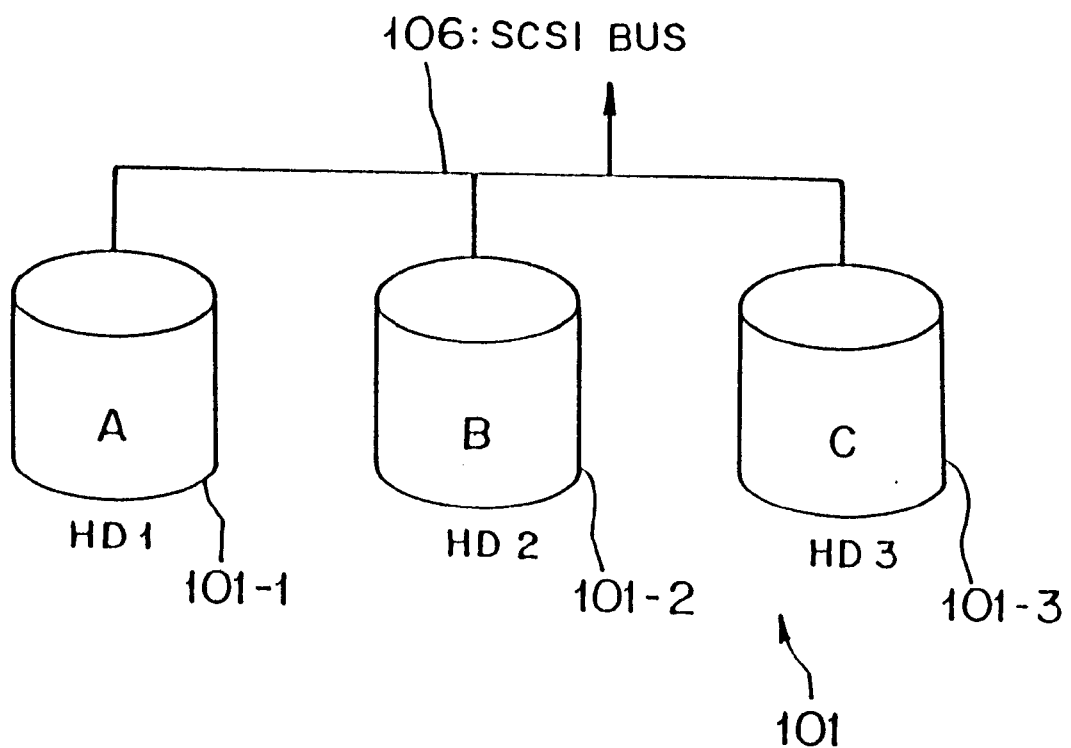
FIG. 12 is a diagram showing the configuration of the storage unit in the data transfer control device.

FIG. 3 is a block diagram showing the data transfer device according to the first embodiment of the present invention. Referring to FIG. 3, the data transfer control device 17 corresponds to that shown in FIG. 11. For example, the data transfer control device 17 which is connected to plural clients 9 via a network 8 such as an ATM network. Thus a VOD (Video On Demand) service can be realized which provides multimedia data having information such as motion picture data and audio data with respect to a time axis, such as information regarding movies, sports, shopping, or the like to the client 9, in response to a request from each of the clients 9.

The data transfer control device 17, shown in FIG. 3, includes hard disks 5-1 to 5-3 acting as storage means, a spare hard disk 5-6 acting as spare storage means, and a data transfer unit 7, and a transfer control unit 10.

Figure 4:
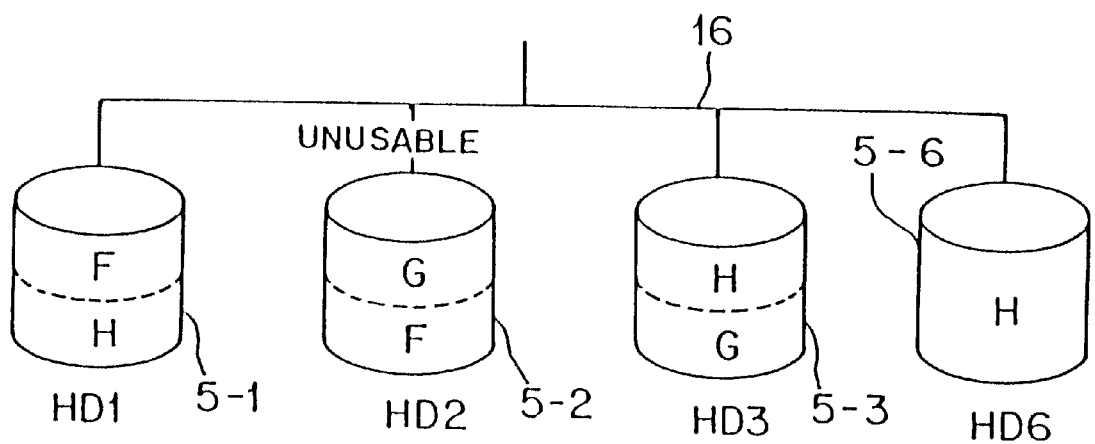
FIG. 4 is a diagram showing data stored in a hard disk according to the first embodiment of the present invention.

In FIG. 3, each of the hard disks (HD 1 to HD3) 5-1 to 5-3, as shown in FIG. 4, stores two different kinds of data among three kinds of data "F", "G", and "H" corresponding to the number of hard disks 5-1 to 5-3.

In other words, the hard disk 5-1 stores data "F" and "H", the hard disk 5-2 stores data "G" and "F", and the hard disk 5-3 stores data "H" and "G".

Each of the three kinds of data "F", "G", and "H", for example, is formed of split data divided into plural titles (in a data unit requested from the client 9). Since the transfer control unit 10 (described later) transfers sequentially three kinds of data "F", "G", and "H" respectively stored into the hard disks 5-1 to 5-3, each client 9 can obtain its requested title.

The hard disk (HD6) 5-6 stores data "H" being one kind of data among the three kinds of data.

The hard disks 5-1 to 5-3 and 5-6 include respectively buffers 6-1 to 6-3 and 6-6 each of which once stores transfer data before data is transferred to the data transfer unit 7.

The data transfer unit 7 inputs data from the buffers 6-1 to 6-6 to the input/output bus 16 such as the SCSI bus and then transfers data to the client 9 via the network 8.

Furthermore, the transfer control unit (transfer control means) 10 accesses sequentially three hard disks 5-1 to 5-3 at the normal time to perform three kinds of data transfer operation. The transfer control unit 10 includes a judging unit 11, a switching unit 12, a forced switching unit 13, a maintaining unit 14, and a position correcting unit 15.

The judging unit (judging means) 11 judges whether accessing any one of three hard disks 5-1 to 5-3 must be halted.

In particular, if any one of three hard disks 5-1 to 5-3 fails, it is judged that accessing the failed hard disk is halted. If the position of the read head of any one of three hard disks 5-1 to 5-3 is corrected, it is judged that accessing a hard disk to be corrected in position must be halted.

When the judging unit 11 judges that accessing any one of three hard disks 5-1 to 5-3 must be halted, the switching unit (switching means) 12 switches the memory region, or the position of the read head, in the remaining two hard disks and the hard disk 5-6 to access it. This operation allows data to be continuously transferred to the client 9.

The forced switching unit (forced switching means) 13 halts forcibly to access any one of three hard disks 5-1 to 5-3, and accesses the remaining two hard disks and the hard disk 5-6, with the memory region, or the position of the read head, switched.

The maintaining unit (maintaining means) 14 maintains the hard disk to which accessing has been forcibly halted by the forced switching unit 13. The position correcting unit (position correcting means) 15 corrects the position of the read head of the hard disk to which accessing has been forcibly halted.

The operation of the data transfer control device with the above-mentioned configuration according to the first embodiment of the present invention will be explained below using the timechart shown in FIG. 5.

In the timechart, the sign "CMD" represents a reading command issuing time. The sign "access" represents a data access time. The sign "HD→FIFO" represents a data transfer time, or a media reading time, to read data from a hard disk to the buffer arranged in the hard disk.

The transfer control unit 10 accesses three hard disks 5-1 to 5-3 to transfer desired data, based on a request from the client 9, and reads data stored therein to the buffers 6-1 to 6-3, respectively, thus transmitting three kinds of data.

The judging unit 11 judges whether accessing any one of three hard disks 5-1 to 5-3 must be halted. If it is judged that accessing any one of three hard disks must be halted, the switching unit 12 switches the memory region to access to the remaining two hard disks and the hard disk 5-6. Thus it is guaranteed that data can be continuously transferred to the client 9.

Figure 5:
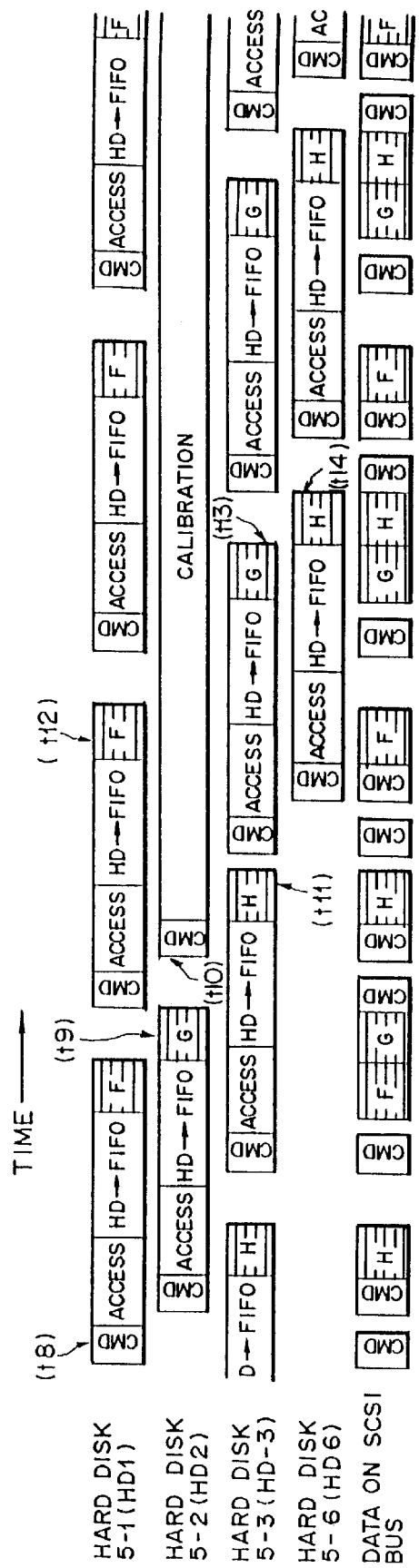
FIG. 5 is a timechart used for explaining the operation of the first embodiment of the present invention.

At the time t8 to the time t9 in the timechart shown in FIG. 5, the transfer control unit 10 accesses the hard disks 5-1 to 5-3 and then transfers data stored in the buffers 6-1, 6-2, 6-3, . . . , sequentially.

While the hard disk 5-2 is being calibrated at the time t10, the judging unit 11 judges that accessing the hard disk 5-2 must be halted.

In this case, the hard disk 5-2 issues a calibration execution command "CMD" to execute a calibrating process.

Thereafter, after data "H" is transferred from the buffer 6-3 at the time t11, it transfers data "F" from the buffer 6-1 at the time t12.

Next, at the time t13, the switching unit 12 switches the position of the reading pointer of the hard disk 5-3 to store data "G" into the buffer 6-3. Thus the data "G" is transferred to the client 9.

Furthermore, at the time t14, the buffer 6-6 in the hard disk 5-6 stores data "H" and then transfers it to the client 9.

The forced switching unit 13 halts forcibly to access any one of three hard disks 5-1 to 5-3 at arbitrary constant intervals and accesses the remaining hard disks and the hard disk 5-6, thus switching forcibly the memory region like the above case.

In such a manner, the maintaining unit 14 maintains the hard disk to which accessing has been forcibly halted and the position correcting unit 15 corrects the position of the read head.

Like the above case, if any one of three hard disks 5-1 to 5-3 fails, it is guaranteed that data is continuously transferred to the client 9.

As described above, according to the data transfer control device according to the first embodiment of the present invention, even if accessing the hard disk is halted, it can be guaranteed that the continuous data transfer can be performed to the client 9 merely by adding one hard disk to normally-used hard disks. Hence there is an advantage in that an increase in the device forming cost, power consumption, or installation space can be greatly suppressed.

Figure 13:
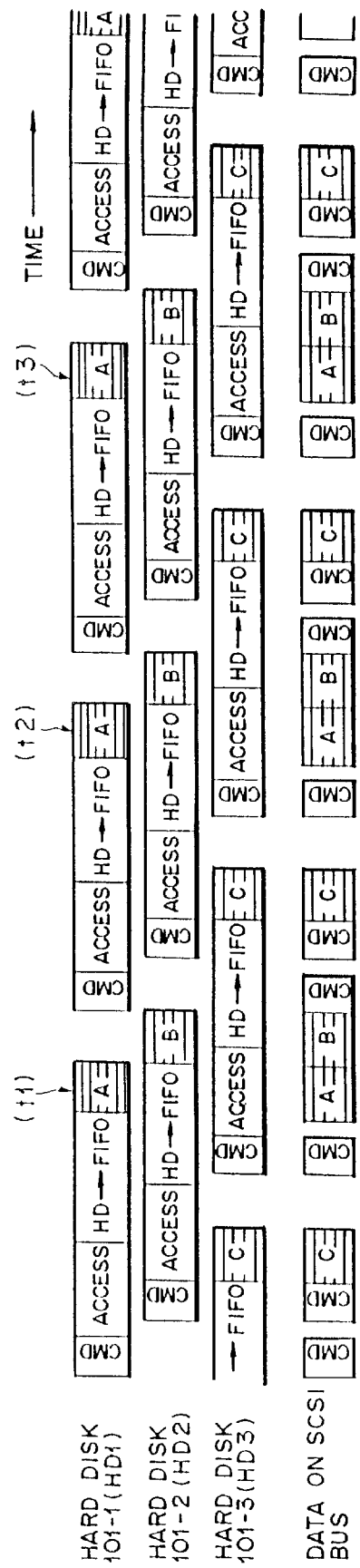
FIG. 13 is a timechart used for explaining the operation of the data transfer control device as applies to FIG. 12.
Figure 14:
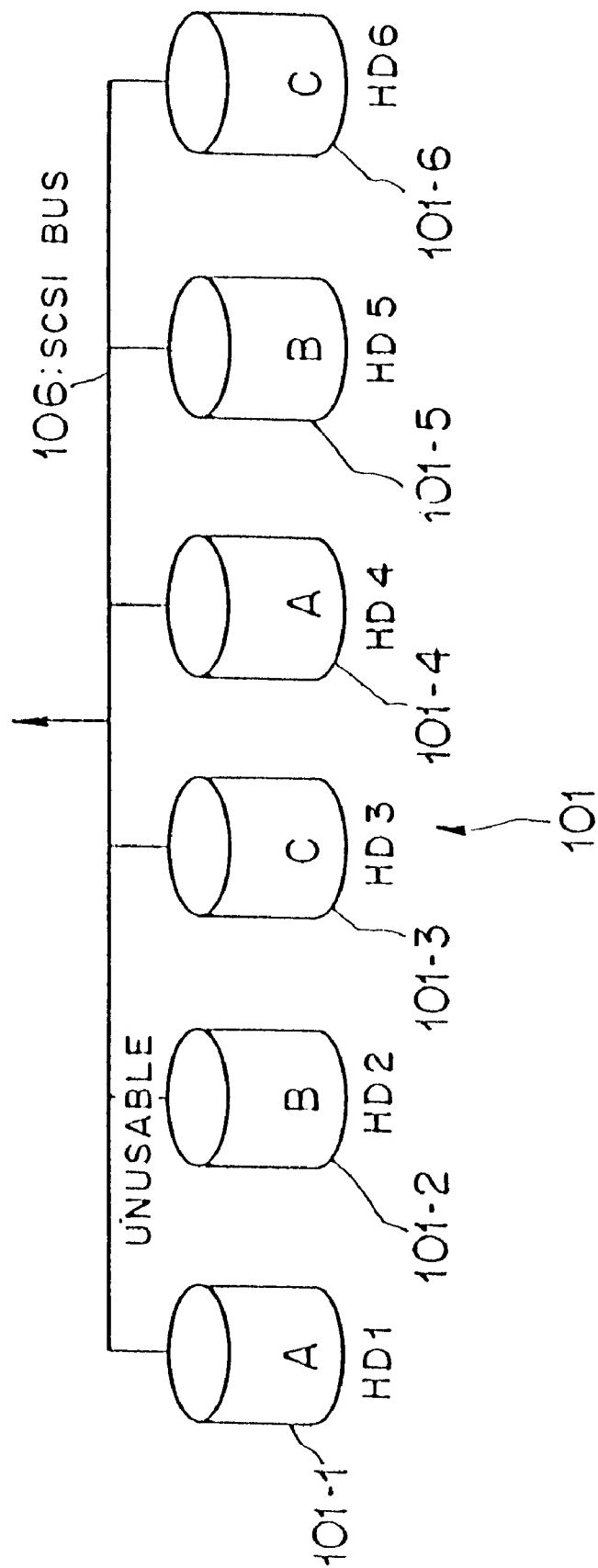
FIG. 14 is a diagram showing the configuration of the storage unit in a data transfer control device.
Figure 15:
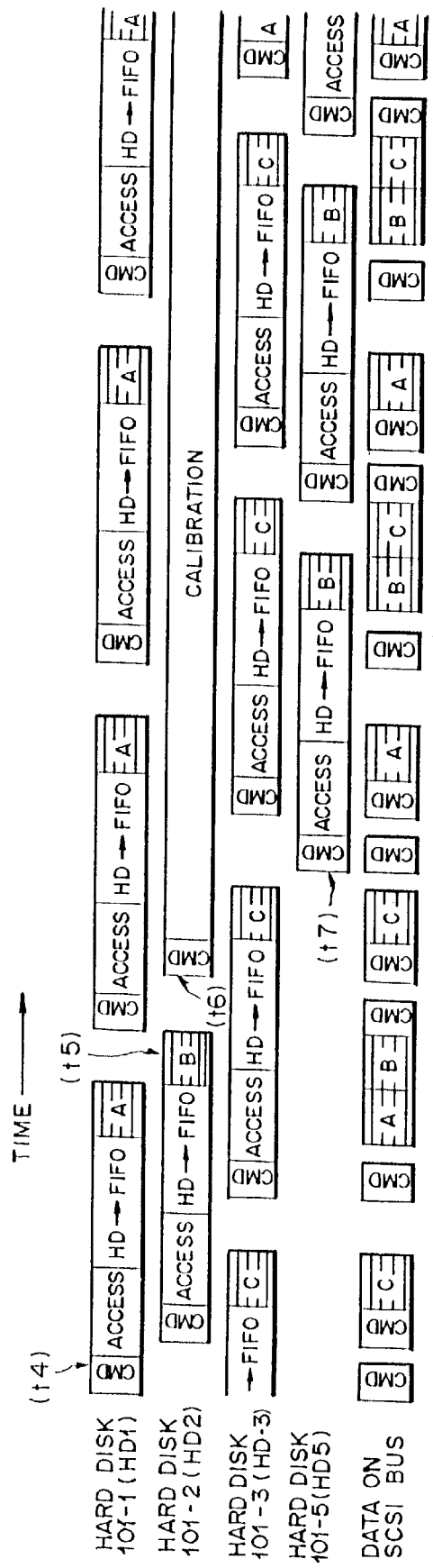
FIG. 15 is a timechart used for explaining the operation of a data transfer control device as applies to FIG. 14.

Increasing one hard disk in addition to a hard disk used in a normal operational time enables the amount of storable data to be increased within the limited number of installed hard disks. Compared with that shown in FIG. 13, there is an advantage in that the amount of storable data can be increased with respect to the number of installed hard disks.

Moreover, when the forced switching unit 13 halts sequentially accesses to the hard disks 5-1 to 5-3 at every arbitrary constant intervals, the maintaining unit 14 performs a maintenance process and the position correcting unit 15 performs a calibration process. Hence there is an advantage in that the reliability of data read out of the hard disk can be improved.

(c) Second Embodiment

Figure 6:
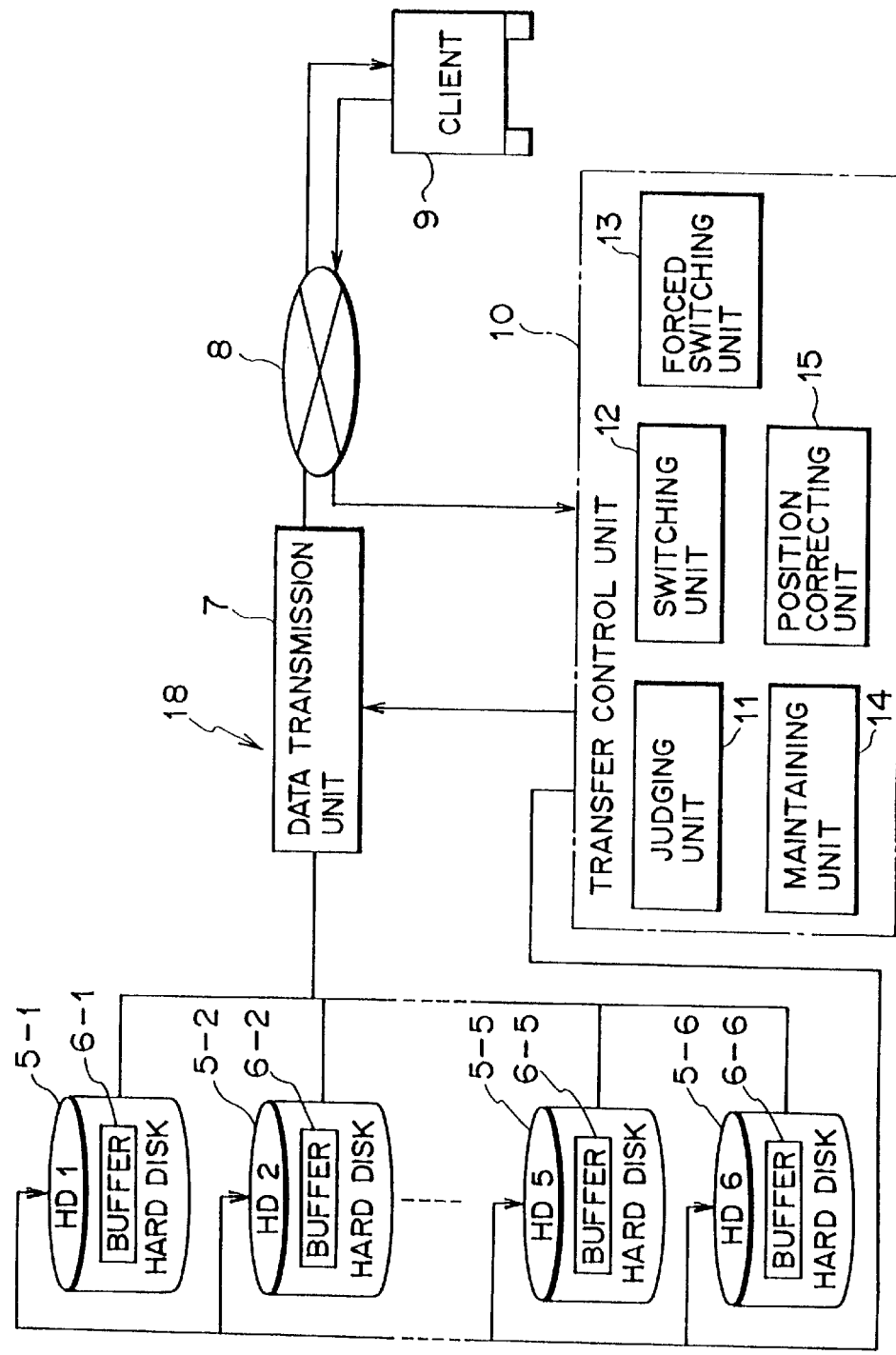
FIG. 6 is a block diagram showing a data transfer control device according to the second embodiment of the present invention.

FIG. 6 is a block diagram showing the data transfer control device according to the second embodiment of the present invention. Referring to FIG. 6, the data transfer control device 18 differs from the data transfer control device 17 of the first embodiment in that five hard disks 5-1 to 5-5 acting as storage means are arranged. Other elements (refer to numerals 5-6, 6-6, 7 to 16) have the same function as those in the first embodiment.

As to the performance specifications of hard disks 5-1 to 5-6, for example, the maximum seek time (A) is about 20.0 ms; the maximum rotation queue time (B) is about 8.0 ms; the effective media reading rate (C) is about 4.0 MBps; the effective data buffer reading rate (D) is about 12.0 MBps; and the buffer size (E) is about 256 KB.

Figure 7:
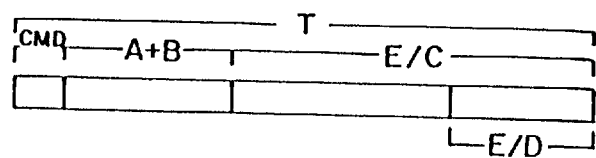
FIG. 7 is a diagram showing one cycle during which data is read out of a hard disk.

The time T per cycle to read data out of each of the hard disks 5-1 to 5-6 can be represented with the values (A) to (E), as shown in FIG. 7.

In FIG. 7, the sign "CMD" represents a command issuing time; the sign "A+B" represents a data access time; and the sign "E/C", or media read time, represents a data transfer time to from the hard disks 5-1 to 5-6 to the buffers 6-1 to 6-6 therein. The signal "E/D" represents a buffer reading time.

In this case, the access time (A+B) is 28.0 ms; the data transfer time (E/C) is 64.0 ms; and the buffer reading time (E/D) is 21.3 ms. Hence, if the command issuing time, for example, is 3 ms, one cycle time T is expressed by the following formula (1):

$$T=CMD+(A+B)+(E/C)=3.0+28.0+64.0=95.0 \text{ (ms)} \quad (1)$$

The hard disk acting as storage means can be used most efficiently by setting the number of hard disks installed acting as storage means to the minimum value M satisfying the following formula (2):

$$T \leq M \cdot (E/D) \quad (2)$$

In this case, where M=5 and the hard disk has the above specification, the hard disks 5-1 to 5-5 according to the present embodiment are used most efficiently.

Figure 8:
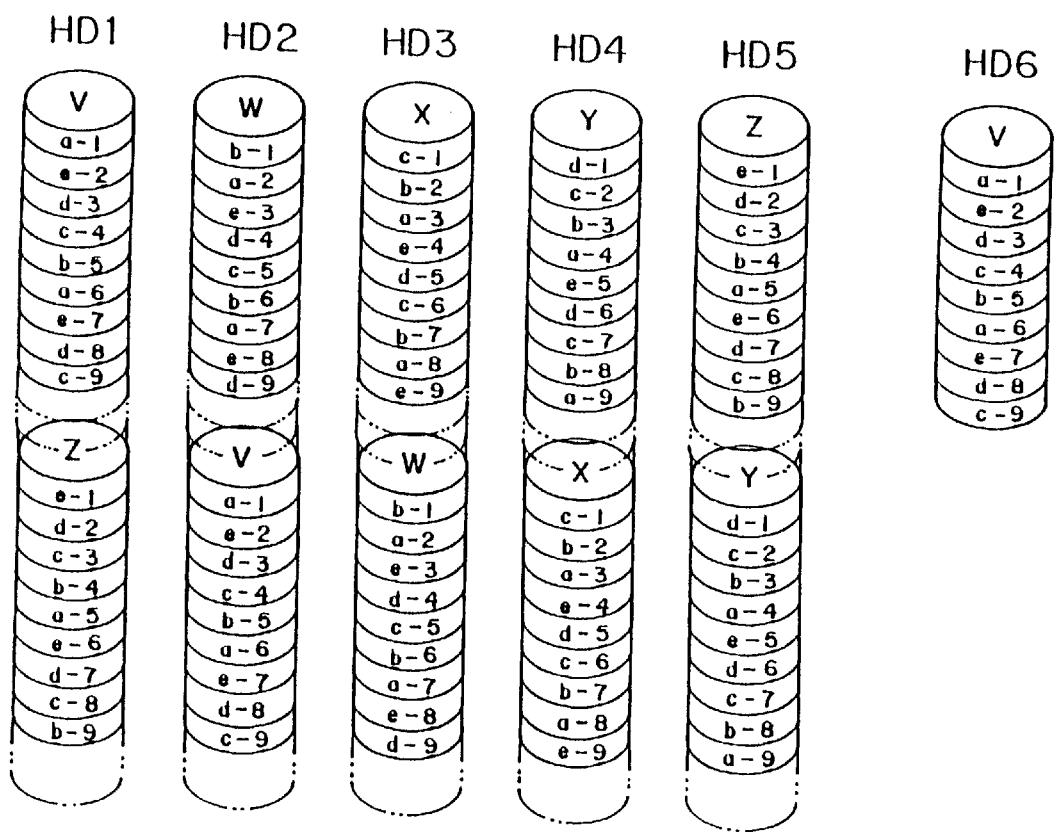
FIG. 8 is a diagram showing data stored in the hard disk according to the second embodiment of the present invention.

The hard disks 5-1 to 5-5, as shown in FIG. 8, store two different kinds of data of five kinds of data "V", "W", "X", "Y", and "Z" corresponding to the number of hard disks 5-1 to 5-3 acting as storage means into each of the memory regions.

In other words, the hard disk 5-1 stores the data "V" and data "Z"; the hard disk 5-2 stores the data "W" and data "V"; the hard disk 5-3 stores the data "X" and data "W"; the hard disk 5-4 stores the data "Y" and "X"; and the hard disk 5-5 stores the data "Z" and data "Y".

As shown in FIG. 8, five kinds of data "V", "W", "X", "Y", and "Z" are formed of 9 pieces of split data (a-1 to a-9, . . . , e-1 to e-9) obtained by dividing five titles (a to e) (data unit requested from the client 9) into 9.

The transfer control unit 10 transfers sequentially five kinds of data "V", "W", "X", "Y", and "Z" stored respectively in the hard disks 5-1 to 5-5 so that each client 9 can obtain a requested title.

The hard disk (HD6) 5-6 stores data "V" as one kind of data among five kinds of data.

The operation of the data transfer control device with the above-mentioned configuration according to the second embodiment of the present invention will be described below with the timechart by referring to FIGS. 9 and 10.

The transfer control unit 10 accesses five hard disks 5-1 to 5-5 to transfer desired data based on a request from the client 9, and reads out data groups stored in "V" to "Z" five hard disks 5-1 to 5-5 to the buffers 6-1 to 6-5, each of the data groups including split data being handled as an access data unit thus transferring five kinds of data (a to e), each piece including split data being handled as a split data unit.

Figure 9:
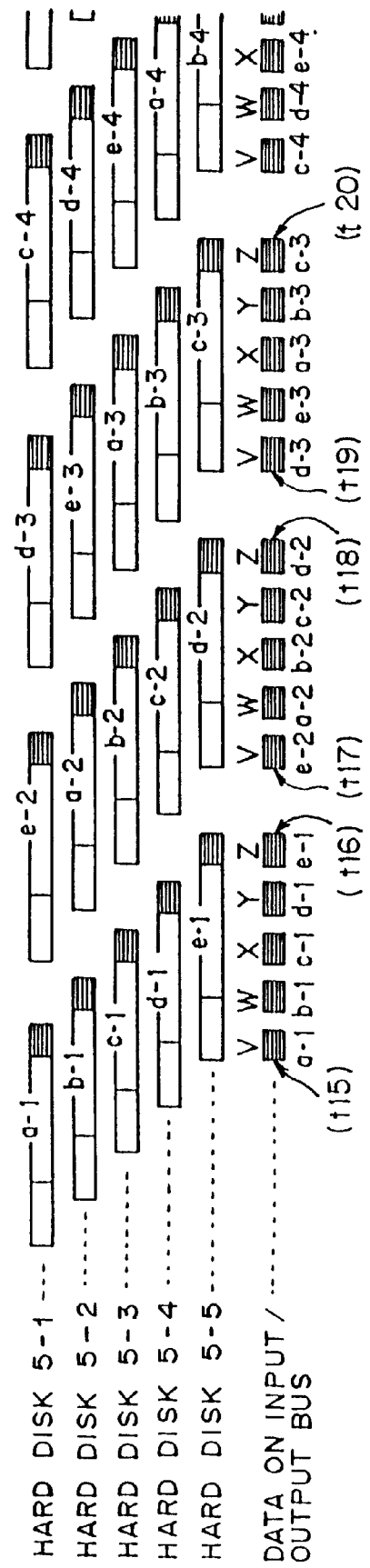
FIG. 9 is a timechart used for explaining the operation of the second embodiment of the present invention.
Figure 10:
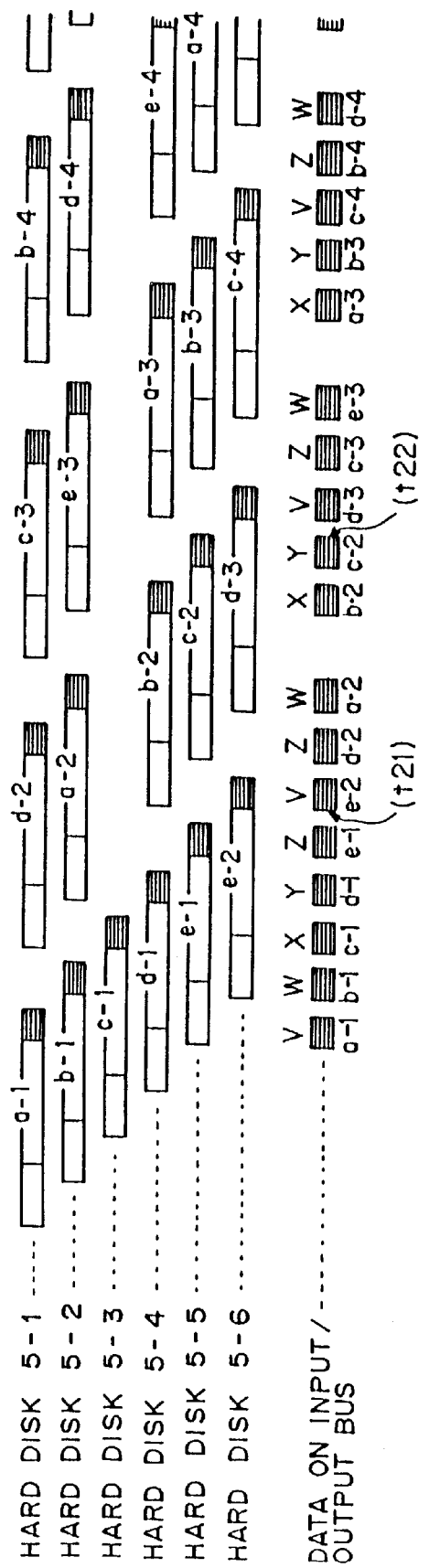
FIG. 10 is a timechart used for explaining the operation of the second embodiment of the present invention.

In particular, the transfer control unit 10 accesses the hard disks 5-1 to 5-5 and then transfers five kinds of data (a-1 to e-1) by reading sequentially data "V", "W", "X", . . . stored in buffers 6-1, 6-2, 6-3, . . . , respectively, during the period ranging from the time t15 to the time t16 in FIG. 9.

Thereafter, similarly, five kinds of data (a to e) are transferred. For example, five kinds of data (a-1 to e-1) are transferred from the time t17 to time t18. Then five kinds of data (a-3 to e-3) are transferred from the time t19 to the time t20.

Data can be transferred with enough time by delaying the utilization factor of the SCSI bus 16 by one piece of data (split data unit) at the time t16 and the time t17.

When the judging unit 11 judges that accessing any one of five hard disks 5-1 to 5-5 must be halted due to a hard disk failure or a position correction of the read head, the switching unit 12 switches the memory region of the remaining four hard disks and the hard disk 5-6 to perform an accessing process. Thus it is guaranteed to continuously transfer data to the client 9.

In particular, as shown in FIG. 9, when it is judged that accessing the hard disk 5-3 must be halted, the reading schedule in which the hard disks 5-1 to 5-5 read respectively and sequentially data "V", "W", "X", "Y", "Z", "X", . . . is changed to the reading schedule in which the hard disks 5-6, 5-1, 5-2, 5-4, and 5-5 5 read respectively and sequentially data "V", "Z", "W", "X", "Y", "V", . . . (refer to the period ranging from the time t21 to the time t22 in the timechart shown in FIG. 10).

The overhead at the time the switching unit 12 switches the reading schedule can be absorbed by the time slot with enough time by delaying previously one piece of data.

The reading schedule is changed from the flow "V", "W", "X", "Y", "Z", "V", . . . to the flow "V", "Z", "W", "X", "Y", "V", . . . , but the reading order for each title (a to e) remains unchanged. Thus the client 9 can receive data normally.

In the above-mentioned manner, even if any one of the five hard disks 5-1 to 5-5 is halted because of a failure of a hard disk or a position correction of the read head, it is guaranteed that data transfer can be performed continuously to the client 9.

Like the first embodiment, the forced switching unit 13 halts forcibly accessing any one of five hard disks 5-1 to 5-5 at arbitrary constant intervals, and switches the memory region to access the remaining hard disks and the hard disk 5-6.

The hard disk to which accessing has been forcibly halted is subjected to a maintenance process by the maintaining unit 14 or a correction process of the read head in position by the position correcting unit 15.

As described above, in the data transfer control device according to the present invention, it is guaranteed that data can be transferred continuously to clients. When the forced switching unit 13 halts sequentially an access to each of the hard disks 5-1 to 5-5 at arbitrary constant intervals, while the maintaining unit 14 performs a maintenance process and the position correcting unit 15 performs a calibration process. Hence the second embodiment has the same advantage as that of the first embodiment. Furthermore, since the number of hard disks installed is set to the minimum value satisfying $T \leq M \cdot E/D$, the hard disk can be utilized efficiently.

(d) Others

The number of installed hard disks acting as storage means as well as the number of kinds of data should not be limited only to the aspects shown in the above-mentioned embodiments and may be set to 2 or more.

In the above-mentioned embodiments, the number of installed hard disks acting as storage means as well as the number of kinds of data are equally set, but may be set differently without any limitation.

What is claimed is:

1. A data transfer control device comprising:
   M storage means each for storing 2 or more different data groups, wherein 2 or more different storage means among said M storage means store N kinds of data groups in an overlapping configuration, each data group including plural pieces of split data obtained by splitting different pieces of title data being handled as one unit, where M is an integer of 2 or more and N is an integer of 2 or more;
   transfer control means for accessing said M storage means and then transferring said N kinds of data groups; and
   spare storage means for storing at least one kind of data group among said N kinds of data groups;
   said transfer control means including:
      judging means for judging whether accessing any particular one of said M storage means is to be halted; and
      switching means for switching regions of said any particular one of said M storage means to said spare storage means and remaining (M−1) storage means when said judging means judges that accessing said any particular one of said M storage means must be halted, and then the switching means performs an accessing operation.

2. The data transfer control device according to claim 1, wherein said judging means judges that accessing a defective storage means must be halted when any one of said M storage means fails.

3. The data transfer control device according to claim 1, wherein said judging means judges that accessing storage means to be corrected in position must be halted when a position of a read head of any one of said M storage means is corrected.

4. The data transfer control device according to claim 1, wherein said integers M and N of 2 or more are set to be equal.

5. The data transfer control device according to claim 1, wherein the number M of said storage means is set to the minimum value satisfying the formula $T \leq M \cdot E/D$, where T is time per cycle in a data reading operation of M storage means, D is an effective data buffer reading rate, and E is a buffer size.

6. A data transfer control device comprising:
   M storage means each for storing 2 or more different data groups, wherein 2 or more different storage means among said M storage means store N kinds of data groups in an overlapping configuration, each data group including plural pieces of split data obtained by splitting different pieces of title data being handled as one unit, where M is an integer of 2 or more and N is an integer of 2 or more;
   transfer control means for accessing said M storage means and then transmitting said N kinds of data groups; and
   spare storage means for storing at least one kind of data group among said N kinds of data groups;
   said transfer control means including:
      forced switching means for forcibly halting accessing any particular one of said M storage means at desired constant intervals and for switching regions of said any particular one of said M storage means to said spare storage means and remaining (M−1) storage means.

7. The data transfer control device according to claim 6, further comprising maintaining means for maintaining a storage means of which accessing has been forcibly halted.

8. The data transfer control device according to claim 6, further comprising position correcting means for correcting a position of the read head of said storage means forcibly halted by said forced switching means.

9. The data transfer control device according to claim 6, wherein integers M and N of 2 or more are set equally.

10. The data transfer control device according to claim 6, wherein the number M of said storage means is set to the minimum value satisfying the formula $T \leq M \cdot E/D$, where T is time per cycle in a data reading operation of M storage means, D is an effective data buffer reading rate, and E is a buffer size.

11. A data transfer controlling method comprising the steps of:
   storing 2 or more different data groups among N kinds of data groups into 2 or more different storage means among M storage means in an overlapping configuration, each data group including plural pieces of split data obtained by splitting different pieces of title data being handled as one unit, where M is an integer of 2 or more and N is an integer of 2 or more;
   storing at least one kind of data group among said N kinds of data groups in spare storage means;
   accessing said M storage means;
   reading data stored in said M storage means to a buffer;
   judging whether accessing any particular one of said M storage means must be halted to transmit said N kinds of data groups; and
   switching regions of said any particular one of said M storage means to said spare storage means and the remaining (M−1) storage means when it is judged that accessing said any particular one of said M storage means must be halted, and then performing an accessing operation.

12. The data transfer controlling method according to claim 11, further comprising the step of:
   continuously reading data from each of said M storage means with a delay of a predetermined period of time.

13. A data transfer controlling method comprising the steps of:
   storing 2 or more different data groups among N kinds of data groups into 2 or more different storage means among M storage means in an overlapping configuration, each data group including plural pieces of split data obtained by splitting different pieces of title data being handled as one unit, where M is an integer of 2 or more and N is an integer of 2 or more;

storing at least one kind of data group among said N kinds of data groups in spare storage means;

accessing said M storage means;

reading out data stored in said M storage means to a buffer;

halting forcibly accessing any particular one of said M storage means at arbitrary constant intervals to transmit said N kinds of data groups; and switching regions of said any particular one of said M storage means to said spare storage means and the remaining (M−1) storage means in an accessing operation.

14. The data transfer controlling method according to claim 13, further comprising the step of:

continuously reading data from each of said M storage means with a delay of a predetermined period of time.

15. The data transfer control device according to claim 1, wherein said different pieces of title data are distributed over more than one of said N kinds of data groups.

16. The data transfer control device according to claim 6, wherein said different pieces of title data are distributed over more than one of said N kinds of data groups.

17. The data transfer controlling method according to claim 11, wherein said different pieces of title data are distributed over more than one of said N kinds of data groups.

18. The data transfer controlling method according to claim 13, wherein said different pieces of title data are distributed over more than one of said N kinds of data groups.

* * * * *